United States Patent [19]

Gefvert

[11] Patent Number: 4,502,149
[45] Date of Patent: Feb. 26, 1985

[54] MULTI-PURPOSE INTERCHANGEABLE MODULAR AUTO LOUDSPEAKER SYSTEM

[76] Inventor: Herbert I. Gefvert, 495 S. Green Bay Rd., Lake Forest, Ill. 60045

[21] Appl. No.: 347,820

[22] Filed: Feb. 11, 1982

[51] Int. Cl.³ .............................................. H04R 5/02
[52] U.S. Cl. .................................. 381/24; 179/146 E; 381/86; 181/145
[58] Field of Search ................ 179/1 GA, 1 VE, 1 E, 179/146 E; 181/144, 145, 150, 198, 199; 455/345; 381/24, 86 X

[56] References Cited

U.S. PATENT DOCUMENTS 3,397,286 8/1968 Prewitt et al. ...................... 179/1 G
3,816,672 6/1974 Gefvert et al. .................. 179/1 E X
4,178,473 12/1979 Vermeren ....................... 179/1 E X
4,182,429 1/1980 Senzaki .............................. 181/144
4,365,114 12/1982 Soma .............................. 179/1 E X

FOREIGN PATENT DOCUMENTS 2729051 1/1979 Fed. Rep. of Germany ...... 179/1 E

OTHER PUBLICATIONS

Advertisement for "Ultralinear", Loudspeakers, *High Fidelity*, Dec., 1978, p. 86.
Angus, Robert, "Separates for Your Car", *High Fidelity*, Dec., 1978, p. 93.
Advertisement for "Jensen" Loudspeakers, *Stereo Catalog* 1979, Ziff–Davis Pub. Co., Dec., 1978, p. 144.

*Primary Examiner*—R. J. Hickey
*Attorney, Agent, or Firm*—Neuman, Williams, Anderson & Olson

[57] ABSTRACT

A modular high-fidelity loudspeaker system is provided for automotive applications, which system is capable of functioning both as a conventional co-axial loudspeaker unit and as separable lower-frequency and higher-frequency modules. When modules are used separately and are mounted in appropriate positions in an automobile interior, greatly enhanced stereo imaging and sound clarity result.

5 Claims, 4 Drawing Figures

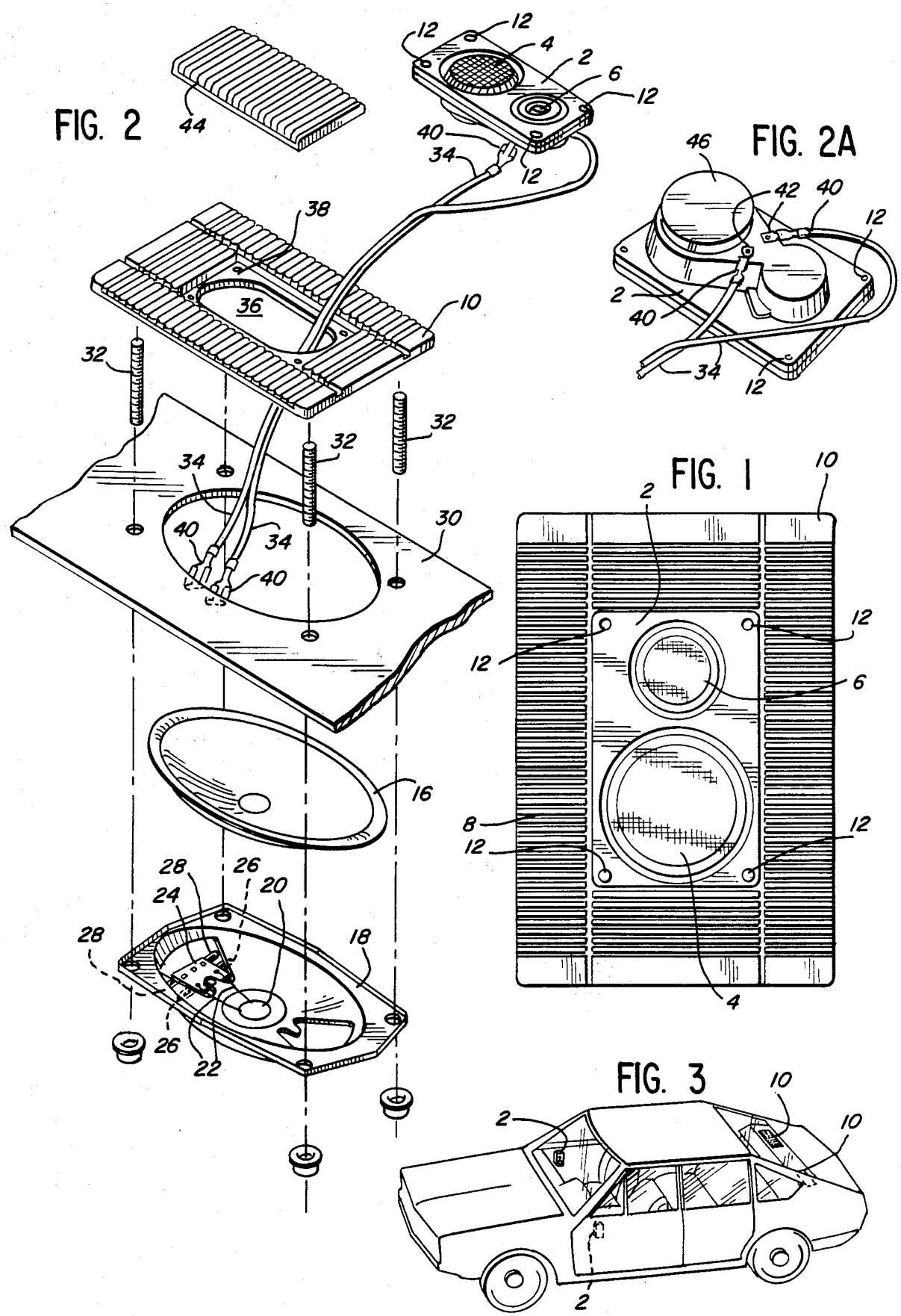

MULTI-PURPOSE INTERCHANGEABLE MODULAR AUTO LOUDSPEAKER SYSTEM

BACKGROUND OF THE INVENTION

The invention relates generally to audio entertainment systems for use in automobiles, trucks and other motor vehicles. More particularly, the invention relates to certain loudspeaker systems to be employed in such vehicles such that the so-called stereo imaging created by such audio entertainment systems may be greatly enhanced.

During the past several years various efforts have been made to improve the overall sound quality of the audio entertainment systems which are installed in automobiles and other motor vehicles. While improvements in the electronic components of such systems, such as amplifiers, radio tuners and tape playback decks, have been significant, those improvements have occurred concurrently with and largely as the result of corresponding improvements in audio systems designed for home use. Developments in the design of loudspeaker systems have also paralleled those in the home audio field, but they have done so to a somewhat more limited extent due to problems faced in the automotive environment which either are not present in the home environment or are of significantly less importance there.

In a stereo or other multi-channel audio system, the listener perceives the desired stereo effect produced by such a system only when he hears the correct proportion of sound emanating from loudspeakers responding to the signals produced by two discreet channels, each bearing a particular combination of sounds, i.e., when there is proper channel separation. Thus, the concept of sound directionality is of critical importance in producing this stereo effect, commonly referred to as the stereo image.

The stereo image is adversely affected when the sound waves reach the listener's ear as the result of reflection rather than direct radiation from the loudspeaker itself, for the reflected sound not only does not reach the ear at the same time as does the directly radiated sound but is perceived to have originated at the reflective surface instead of the loudspeaker. Since the optimum stereo image results from carefully chosen loudspeaker location, it follows that loudspeaker placement which creates sound which is perceived to have originated at points other than the positions of the loudspeakers would deleteriously affect the stereo image. Thus, a crucial function of loudspeaker placement is to maximize the ratio of direct to reflected sound reaching the listener's ear in a listening environment.

The placement of the transducers which produce the middle and higher sound frequencies is of particular importance to the creation of an optimum stereo image, for it is well known that the middle and higher sound frequencies are, relative to the lower frequencies, highly directional due to their shorter wavelengths. Evidence of this fact is the observation that, as the frequency of the sound increases, the radiation pattern of the sound waves becomes less hemispherical and more like a narrow, directional beam. Lower-frequency sounds, on the other hand, are essentially nondirectional due to their longer wavelengths, and they therefore make a negligible contribution to stereo imaging. For example, it has been demonstrated that, at equal loudness levels, sounds below 125 Hertz which are reflected by an order of one to two are perceived by the listener as being directly radiated to that listener. Accordingly, it is the middle and higher frequencies which are, as a result of their directional character, almost exclusively responsible for determining the extent to which a proper stereo image is produced by the loudspeakers.

While the placement of the middle- and higher-frequency transducers relative to the ear of the listener therefore determines the ratio of direct to reflected mid- to high-frequency sound and thus affects the extent to which proper clarity and stereo imaging is achieved in any environment, e.g., a living room or a concert hall, such loudspeaker placement is of critical importance in achieving proper stereo imaging in an automobile. This importance results from the fact that an automobile passenger compartment is a small-volume listening environment, highly crowded with sound absorbing surfaces, sound-reflecting surfaces and obstructions which present physical barriers to the transmission of sound waves directly from possible loudspeaker locations to the ears of the listener. Thus, the passenger compartment is an inherently hostile environment for the creation of a proper stereo image by the highly directional middle and higher frequency sounds absent proper placement of the middle- and higher frequency transducers.

Moreover, because of the small volume of the automobile interior and the presence of numerous sound-reflecting surfaces, the occurrence of interference patterns in the sound waves may adversely affect the clarity of the sound reaching the listener. This effect is the result of the fact that in an automobile interior there is a relatively very short distance between the point of origin of the sound wave (the transducer) and the nearest reflecting surface. The deleterious effect of such interference is more pronounced for middle and higher frequency sounds because the small volume of the automobile interior is more conducive to the creation of interference patterns in the mid- to high-frequency sound waves due to their relatively short wavelengths, which range from a few feet to less than an inch in length. Such interference patterns are much less likely to occur in the low frequency sounds because their wavelengths are roughly one to eight times the length of the typical automobile interior. Accordingly, because the presence of a disproportionate amount of reflected sound makes it more likely that such interference will occur, the benefit of increased sound clarity also results from the placement of the middle- and higher frequency transducers so as to maximize the directly radiated sound reaching the ear of the listener.

One attempt to overcome the shortcomings of the automobile interior as a listening environment has been simply to increase the number and location of full-range loudspeakers so as to insure that the ratio of direct to reflected mid- to high-frequency sound reaching the listener's ears may be greatly increased. The drawback of this solution is that the additional loudspeakers placed in additional locations will prevent the listener from perceiving two discreet audio signals, thereby defeating rather than enhancing the stereo image due to the lack of separation of the stereo channels.

Another attempted solution has been to locate the entire loudspeaker system as close to the listener's ear as possible. While such a solution might be workable when highly compact loudspeaker systems consisting of a single full-range transducer are acceptable, it is not a practicable one where high-fidelity, multiple-transducer loudspeaker systems are employed, for such systems are of such such a size as to prohibit their placement in those locations which would optimize sound clarity and stereo imaging, e.g., in the upper portions of the front doors or in the dashboard.

SUMMARY OF THE INVENTION

In accordance with the present invention, a modular loudspeaker system for use in an automobile or other vehicle is provided which permits the highly directional mid- and high-frequency sounds to be radiated directly to the listener's ear, thereby greatly enhancing the stereo imaging achieved by the stereo audio system. This result is accomplished by providing a new multiple transducer loudspeaker system which permits the mid- and/or high-frequency transducers to be removed as a module from the system and placed at a location in the automobile interior which permits direct radiation of sound to the listener's ear.

More particularly, the loudspeaker system of the invention comprises a low-frequency module having a lower frame for supporting a low-frequency transducer (commonly known as a "woofer") and a woofer mounted in the lower frame; an upper grille/frame or grille/platform attached to the lower frame so as to firmly secure the woofer in the lower frame, said grille/platform having a cut-out therein for receiving and removably supporting a higher-frequency loudspeaker module (commonly known as "midrange/tweeter" module or enclosure); removable mounting means for physically securing the midrange/tweeter module to the upper grille/platform; and detachable electrical terminal means for removably electrically connecting the midrange/tweeter module to the audio power source.

Preferably, the removable module is a two-speaker sealed enclosure containing a midrange transducer, a high-frequency transducer and an appropriate crossover network. The enclosure, because it is air-tight, may preferably be designed to improve the sonic qualities of the transducers housed therein.

It is also preferred that the loudspeaker system be provided with a separate blank grille insert which the user may attach to the upper grille/platform when the midrange/tweeter module has been removed for placement at a location best suited to producing an optimum stereo image.

With the midrange/tweeter module mounted in the upper grille/platform, the combination of the two modules is capable of functioning as a high-fidelity tri-axial loudspeaker system. In the preferred embodiment, the cut-out in the grille/platform is disposed so that the mounted midrange/tweeter module presents no obstruction of sound radiated from the woofer. This is accomplished by providing a midrange/tweeter module which is aligned so that its longitudinal axis coincides with the longitudinal axis of the woofer cone and by positioning the midrange/tweeter module at a height above the apex of the woofer cone of not less than 10% nor more than 25% of the wavelength of the cross-over frequency. Moreover, for maximum dispersion from the midrange portion of the system, a transducer is utilized which has a speaker cone angle of 15° with respect to the plane of the enclosure. Finally, a woofer is provided which employs a KAPTON ® voice coil for power-handling and high temperature stability and further employs a speaker cone of polypropylene. This high-fidelity combination while providing good sound characteristics when utilized as a conventional tri-axial system, nonetheless is incapable of producing proper stereo imaging for the reasons heretofore discussed.

In use as the preferred modular system, however, the directional sound producing midrange/tweeter module (one for each channel) is removed from the grille/platformand mounted as close to the listener's ear as possible. The maximum benefit will be obtained by mounting the midrange/tweeter modules on the uppermost portions of the front doors or at a location on the dashboard where there will be an unobstructed path between the surface of the transducers and the listener's ear. The essentially non-directional woofer is preferably mounted on the rear package shelf or deck so as to utilize the automobile trunk as an acoustic chamber. The desired clarity and stereo imaging are thereby obtained.

Accordingly, it is an object of the invention to provide a high-fidelity modular loudspeaker system for use in an automobile or other vehicle which is capable of functioning as a high-fidelity conventional tri-axial loudspeaker, but which also permits the placement of the non-directional woofer module at any convenient place, while permitting the placement of the highly directional midrange/tweeter module in such a position as to maximize the ratio of direct to reflected mid- to high-frequency sound and to automobile environment.

Another important object of the invention is to provide a loudspeaker system which has utility both as a conventional coaxial system and as a seperable modular system. This provides the user with a flexible, convenient product and provides the audio dealer with a product requiring the maintenance of an inventory of but one separable product rather than of three individual components; i.e., a co-axial loud-speaker, a midrange/tweeter, and a woofer.

It is a further object of the invention to provide a high fidelity modular loudspeaker system containing a midrange/tweeter module which is entirely functionally self-contained and which is easily detachable, both physically and electrically, from the supporting woofer module.

A related but subsidiary object is to provide a high fidelity modular loudspeaker enclosure system containing a woofer module which, when the midrange/tweeter module has been removed therefrom, is readily restored to a pleasing appearance by the attachment of a blank grille insert or by other similar means.

An additional object of the invention is to provide a high fidelity modular loudspeaker system which maximizes the ratio of direct to relected mid- to high-frequency sound without the need for adding additional loudspeakers.

Other objects and advantages of the invention will be apparent to those skilled in the art from the following drawings and detailed description.

DESCRIPTION OF THE DRAWINGS

FIG. 1 is top plan view of the loudspeaker system with the midrange/tweeter module mounted upon the woofer module.

FIG. 2 is an exploded view of the loudspeaker system of the invention, with the underside of the midrange/tweeter module shown as FIG. 2A.

FIG. 3 is an elevational perspective view of the loudspeaker modules separately mounted in an automobile interior.

DETAILED DESCRIPTION

As shown in FIG. 1, the loudspeaker system of the invention, when assembled as a single tri-axial loudspeaker, is constructed of a midrange/tweeter module 2, containing midrange transducer 4 and high-frequency transducer 6, mounted above the woofer 8 upon an upper grille/platform 10 by appropriate removable fasteners 12.

Details of the construction of the loudspeaker system and of the removability of midrange/tweeter module 2 are shown in FIG. 2. The low-frequency, or woofer, module comprises the low frequency transducer, or woofer, 8, which is illustrated in FIG. 2 with the woofer cone 16 removed so as to reveal the understructure of the transducer. The woofer frame 18 is shown supporting the voice coil and magnet assembly 20, woofer connecting wires 22 and connector board 24. Slip fit connectors 26 and 28 are attached to connector board 24.

As further shown by FIG. 2, the woofer and its component parts are preferably mounted below the deck panel 30 of the automobile.

Above deck panel 30 and fastened to woofer 8 by studs 32 is upper grille/platform 10 which provides both a visually pleasing convering for woofer 8 and a means of support for midrange/tweeter module 2. Centered in grille/platform 10 is an aperture 36, around the perimeter of which is formed flange 38, which receives and supports midrange/tweeter module 2. As shown in FIG. 2A, the rear portion of the midrange/tweeter module 2 is completely enclosed by contoured back plate 46 so as to effect an air-tight seal. Removable electrical connection between midrange/tweeter module 2 and woofer 8 is made by means of connecting wires 34 having slip-fit connectors 40 at both ends thereof. Wires 34 are removably attached to terminals 42 on the underside of midrange/tweeter module 2 (as shown in FIG. 2A) and to woofer connectors 28 on connector board 24.

Upon removal of midrange/tweeter module 2, the appearance of the upper grille/platform 10 is preferably restored by installing blank grille insert 44 in aperture 36 in place of the removed midrange/tweeter module.

In FIG. 3, the modular loudspeaker system of the invention is shown installed in a representative automobile for use with any stereo audio signal source. Midrange/tweeter modules 2 are shown in their preferred locations on the uppermost portions of the front doors, while the woofer modules are shown, to the extent their upper grille/frames are visible, mounted on the rear deck.

The foregoing description of the preferred embodiment of the loudspeaker system of the invention clearly shows the ease of removability of the midrange/tweeter module from the woofer module which enables the user to utilize the system as a conventional tri-axial system or, preferably, by separation of the modules, to create proper stereo imaging in a high-fidelity automobile audio system.

While the invention and its construction have been described in detail by reference to a specific preferred embodiment thereof, variations, modifications and substitution of equivalent structural elements are understood to be within the scope and spirit of this invention.

In one preferred embodiment the module containing the higher-frequency directional transducer is mounted in the grille at about one and one-eighth inches above the apex of the woofer cone when the cross-over frequency of the woofer/midrange-tweeter system is about 1250 Hertz. The axis of the midrange/tweeter is essentially superimposed on the longitudinal major axis of the generally elliptive woofer and the mid-point between the center of the midrange and tweeter speakers is essentially over the center apex of the woofer.

What is claimed is:

1. A loudspeaker system for use in a motor vehicle comprising a first module having a lower-frequency transducer, a grille covering said first module, said grille having a receptacle coaxially positioned above said lower-frequency transducer, and a second module having at least one higher-frequency transducer, said second module being adapted to be removably accommodated in said receptacle, whereby said second module is adapted to operate either while accommodated in said receptacle as part of a co-axial loudspeaker system, or, alternatively as an independent loudspeaker.

2. A loudspeaker system according to claim 1 wherein said receptacle comprises an aperure formed in said grille, around the perimeter of which is disposed a flange for receiving and supporting said second module.

3. A loudspeaker system according to claim 1 further comprising a blank grille insert for covering said receptacle upon removal of said second module.

4. A loudspeaker system according to claim 1 wherein said second module contains a mid-frequency transducer and a high-frequency transducer.

5. A loudspeaker system according to claim 1 further comprising a cross-over circuit, and wherein said receptacle is adapted for coaxially positioning said higher-frequency transducer with respect to said lower-frequency transducer at a distance equal to between 10 and 25 percent of the wavelength of the cross-over frequency.

* * * * *